United States Patent [19]

Ahrens

[11] Patent Number: 4,693,084
[45] Date of Patent: Sep. 15, 1987

[54] CHARGE COOLER ANGLE DUCT

[75] Inventor: William K. Ahrens, Novi, Mich.

[73] Assignee: General Motors Corporation, Detroit, Mich.

[21] Appl. No.: 889,278

[22] Filed: Jul. 25, 1986

[51] Int. Cl.⁴ ............................................. F02B 29/04
[52] U.S. Cl. ...................................... 60/599; 123/563; 165/174
[58] Field of Search .......................... 60/599; 123/563; 165/174

[56] References Cited

U.S. PATENT DOCUMENTS

| | | | |
|---|---|---|---|
| 3,091,228 | 5/1963 | Maxwell | 60/599 |
| 3,444,845 | 5/1969 | Scheiterlein | 60/599 X |
| 4,452,216 | 6/1984 | Patchen, II et al. | 123/563 |
| 4,470,378 | 9/1984 | Malik et al. | 123/52 M |
| 4,476,842 | 10/1984 | Belsanti | 123/563 |

Primary Examiner—Stephen F. Husar
Attorney, Agent, or Firm—Robert J. Outland

[57] ABSTRACT

An angle duct for connecting, through a curved elbow section, a turbocharged engine charge cooler with oblong ends with a turbocompressor outlet or a manifold inlet having compact cross sections. The duct has tapered diffusing or expanding end sections enlarged in cross section and increasingly oblong toward the cooler joined by the flattened elbow section having constant or similarly increasing cross section. The combination in an engine induction system combines efficient flow diffusion and/or expansion together with low loss flow through the elbow and good distribution of fluid flow over the charge cooler inlet area.

8 Claims, 4 Drawing Figures

CHARGE COOLER ANGLE DUCT

TECHNICAL FIELD

This invention relates to combustion engine induction systems and, more particularly, to turbocharged engines and to angle ducts capable of use in a turbocharged engine for conducting inlet charges through a curved passage between a compact connection, such as a turbo-compressor outlet, and an oblong charge cooler header inlet or outlet.

BACKGROUND

It is known in the art relating to turbocharged internal combustion engines and the like to provide an aftercooler for cooling the intake charges delivered to the engine from the turbo-compressor. The aftercooler is a heat exchanger which transfers heat from the compressed induction air or air-fuel mixture to a second fluid such as ambient air or the engine coolant.

The compressor outlet is usually of compact cross section and generally is of circular or nearly circular cross-sectional shape. The charge cooler generally takes the form of a radiator core, in the case of an air-to-air heat exchanger, or a cooler core in a housing, in the case of an air-to-water heat exchanger. In either case, the charge cooler inlet is usually oblong, generally rectangular, with a much larger cross-sectional area than that of the compressor outlet to which it is connected.

While many arrangements are possible, it may be advantageous in an in-line engine with a cross-flow cylinder head (intake and exhaust ports on opposite sides of the head) to mount the engine turbocharger on the exhaust side of the engine and connect the output of the compressor through ducting with a distantly mounted aftercooler. Such may be located, for example, on the inlet side of the engine nearby or integrated with the intake manifold for engine water cooling, or at the front end of a vehicle engine compartment, preferably ahead of or adjacent to the radiator, for ambient air cooling.

In such cases, there is required a connecting duct leading from the compressor outlet with its compact (circular, square or the like) outlet area to the charge cooler inlet which usually comprises a large header of rectangular or other oblong shape. An outlet connection from the charge cooler to the intake manifold is also requires in the case of a front mounted charge cooler.

SUMMARY OF THE INVENTION

The present invention provides an angle duct for connection between the compressor outlet and charge cooler inlet capable of efficiently conducting and diffusing compressed intake charges from the compact cross section at the compressor outlet through a curved path to the oblong cross section of greater area at the charge cooler inlet. Alternatively, a similar duct may be used for connection between the cooler outlet and the intake manifold inlet to efficiently conduct and accelerate the cooled charges from a distally mounted charge cooler to the engine intake manifold or other system component.

An angle duct according to the invention may include three main sections: an entry section having a compact initial portion merging into a wider and narrower diffusing portion; a curved connecting section with a narrow radial thickness and a constant or further increasing progression of cross-sectional areas; and an exit section with further diffusion of flow particularly through widening of the narrower dimension of the cross section to essentially the configuration of the charge cooler header.

The invention produces efficient duct arrangements for conducting the charge flow around a sharply curved path with minimal pressure loss and distributing the flowing charge evenly over the face of the charge cooler core inlet. In this way, superior performance of the induction and aftercooling systems is promoted.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
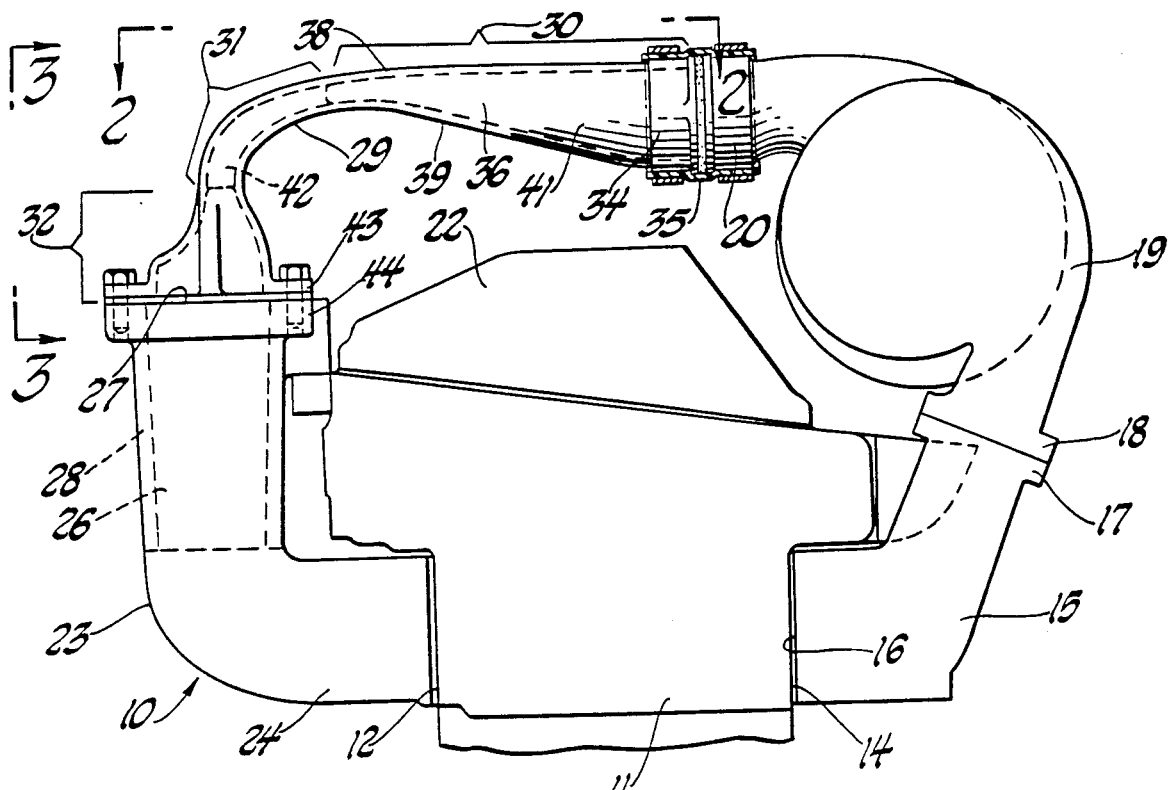
FIG. 1 is a front end view of the upper portion of a turbocharged and aftercooled diesel type internal combustion engine having an angle duct in accordance with the invention.

Referring now to the drawings in detail, numeral 10 generally indicates a diesel internal combustion engine having a block with a plurality of inline cylinders, not shown. A cylinder head 11 is mounted on the block closing the ends of the cylinders and providing intake and exhaust ports, not shown. The ports extend in cross-flow fashion through opposite side walls 12 and 14, respectively, of the cylinder head and communicate with each of the cylinders.

On the exhaust side wall 14, there is mounted an exhaust manifold 15 connecting at one end 16 with the exhaust ports and at the other end 17 with the turbine inlet 18 of a turbocharger 19 disposed on the inlet side of the engine. The turbocharger also includes a compressor outlet 20 having a generally circular cross section, not shown, and positioned to direct a flow of compressed intake air horizontally across the top of a rocker cover 22 mounted on the cylinder head 11.

An intake manifold 23 is mounted on the intake side wall 12 and includes generally horizontal legs 24 feeding the intake ports and an upstanding housing portion 26 with an open top forming an inlet 27. The housing portion encloses an air-to-water aftercooler core 28, the construction being, preferably, similar to that shown in U.S. Pat. No. 4,470,378 issued Sept. 11, 1984 to the assignee of the present invention. The inlet 27 is of generally rectangular oblong configuration with the longer dimension extending longitudinally alongside the cylinder head and the shorter dimension extending laterally thereof. This inlet provides an opening not only for inlet charge air flow into the charge air cooler core but also for removal and replacement of the cooler core 28 in its manifold housing.

In accordance with the invention, the engine is further provided with an angle duct 29 which connects the compressor outlet end 20 with the charge cooler inlet 27. The duct 29, although preferably formed as an integral member such as an aluminum casting, may for descriptive purposes be divided into three separate sections: a compact section or entry section 30, an elbow section 31 and a core attaching section or exit section 32.

The compact or entry section 30 includes a connecting portion or initial portion 34 having a compact circular cross section essentially matching that of the compressor outlet 20 and connected thereto by suitable means such as a flexible hose 35. If desired to match a differently shaped compressor outlet or connector member, the initial portion 34 could have any other compact configuration such as elliptical, square, rectangular, etc. In each case, the initial portion may be considered as having four sides, whether curved, planar or otherwise configured, forming the compact cross section.

The initial portion 34 merges into a tapered portion or diffusing portion 36 having, in the flow direction away from the initial portion, increasingly wider outer and inner sides 38 and 39, respectively, and increasingly narrower opposite connecting sides 40, 41, which together define increasingly oblong cross sections of smoothly increasing area configured to provide efficient diffusion of the compressed charge air flow.

The elbow section 31 extends from the diffusing portion in a path curving downward about a horizontal axis, not shown. In this section the connecting sides 40, 41 reach their narrowest extent, thus providing maximum flow efficiency for the charge flow through the curving path. The cross-sectional areas may be held constant or, if desired, increased to provide further diffusion in the flow direction; however, they would not be reduced. In general, the widths of the outer and inner sides 38,39 will continue to increase so that the cross sections will become increasingly oblong in the flow direction.

Webs 42 may be provided in the duct curved portion extending between the wider sides 38, 39; however, the webs must be angled along the direction of flow in the duct to avoid interfering with free flow and reducing efficiency. The purpose of such webs is to support the sides 38, 39 to minimize their vibration or drumming and thus limit noise. They have not been found necessary for acting as vanes to direct the flow and, thus, are not needed if the walls are sufficiently stiff.

The exit section 32 extends from the elbow section with oblong cross sections of further increasing area that further diffuse the flow. This is primarily accomplished by increasing the width of the narrower connecting sides 40, 41, although the wider sides 38, 39 may also be increased. The exit section ends at a flange 43 which is of rectangular shape, matching that of a mating flange 44 defining the inlet 27 of the intake manifold 23 and surrounding the inlet of the charge cooler core 28 located therein.

When an angle duct is constructed in the manner indicated with careful design attention paid to avoiding sudden changes in cross section and direction of the duct, a curved path—leading from a turbocompressor outlet of compact cross section, around a curve at right angles, more or less, and into an oblong charge cooler inlet of greatly enlarged area—can be defined that will efficiently carry the compressed inlet charges and distribute them evenly across the cooler inlet. Reduced pressure loss and improved charge cooler effectiveness are thus obtained as compared to prior art angle duct configurations. Improved engine fuel economy may thus be obtained for turbocharged and aftercooled engines using such angle duct arrangements in accordance with the invention.

Figure 4:
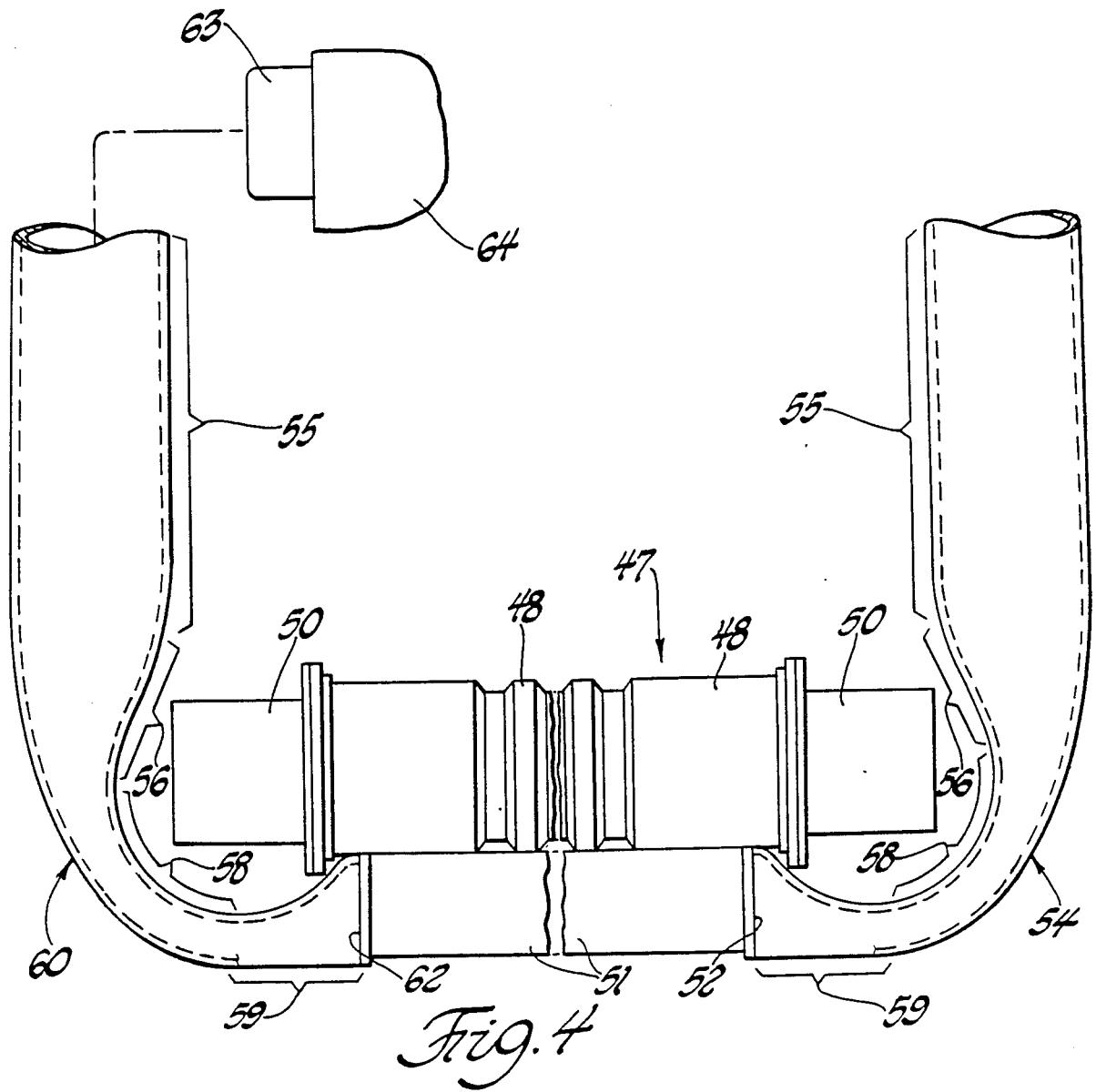
FIG. 4 is a top view of a portion of an alternative embodiment of air-to-air charge cooled induction system having an angle duct.

Referring to FIG. 4, there is shown an alternative angle duct application wherein an automotive vehicle, such as a truck, is generally indicated by numeral 47. At the front of the engine compartment, not shown, there is conventionally mounted a coolant radiator 48 with side mounted headers 50. Ahead of the radiator 48 is an air-to-air charge cooler heat exchanger 51 having a side inlet 52 of rectangular shape, much higher than deep. Into this inlet 52, there must be conducted inlet charges passing from a turbocompressor outlet, not shown, of circular (compact) configuration.

Figure 2:
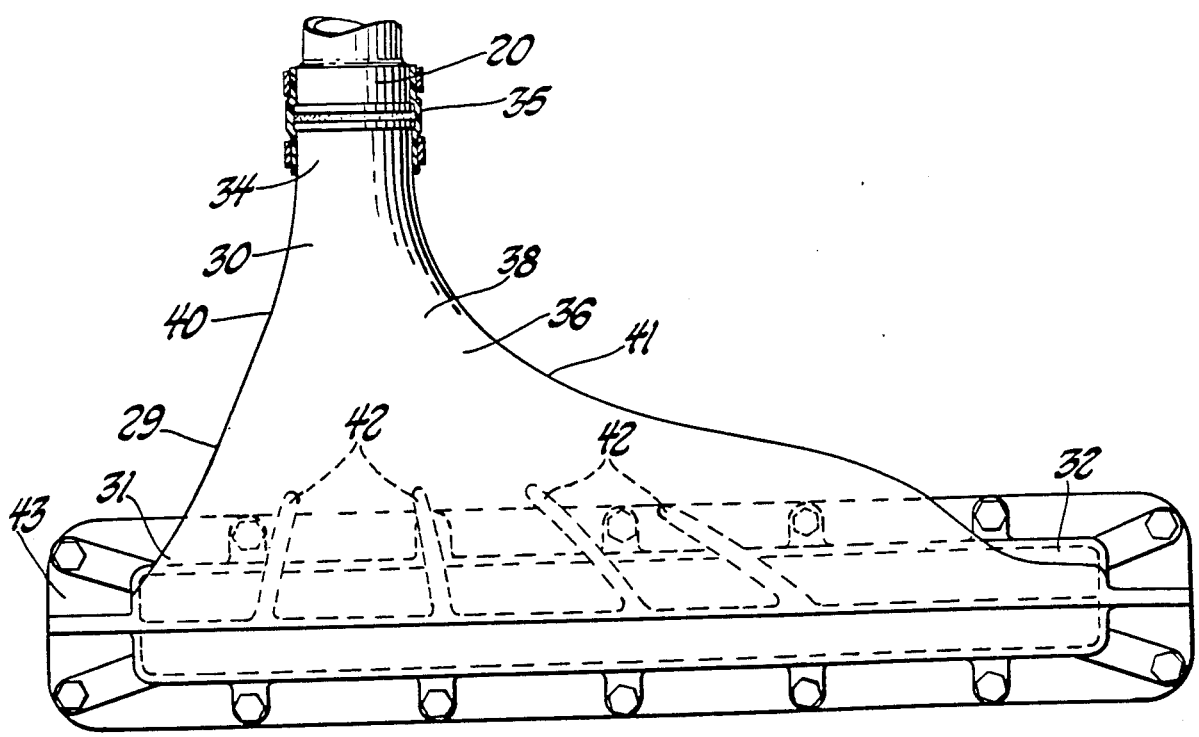
FIG. 2 is a top view of the angle duct portion of the engine induction system as seen from the plane of the line 2—2 of FIG. 1.
Figure 3:
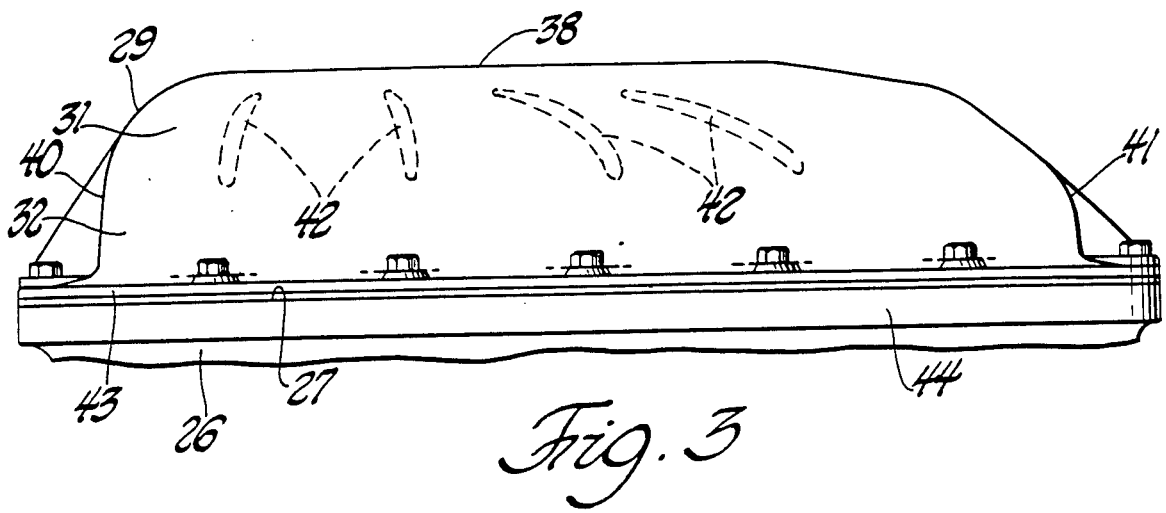
FIG. 3 is a side view from the plane of the line 3—3 of FIG. 1.

This is accomplished by an angle duct 54 which includes a straight tubular section 55 connecting with the compressor outlet and, sequentially, with a compact section 56, an elbow section 58 and a core attaching section 59 as in the previous arrangement. The configuration of the angle duct is especially designed to conduct the compressed charge flow to the heat exchanger through the relatively small clearance available between the radiator header and the sides, not shown, of the truck engine compartment. In the FIG. 4 embodiment, the cross-sectional area is held essentially constant through the curved elbow section while in the embodiment of FIGS. 1-3 the area is increased in the flow direction to provide further diffusion.

An outlet angle duct, 60 like that of the inlet angle duct 54 is connected to the rectangular cooler outlet 62 located opposite from the inlet 52. The outlet angle duct includes similar sections 55, 56, 58, 59 and conducts the cooled engine intake charges from the large area rectangular cooler outlet 62 to the smaller cross section inlet 63 of the associated engine intake manifold 64. The outlet duct is installed so that flow therethrough is in the reverse direction from that previously described, i.e. from the core attaching section 59 through the elbow section 58 to the compact section 56 and then through the tubular section 55. In this way, the flow efficiency of the angle duct and the space efficient configuration is taken advantage of on both sides of the charge cooler heat exchanger.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A curved angle duct for connection between a member having a compact cross section and a charge cooler connection having much larger area and an oblong cross section with wider and narrower sides, said duct comprising a compact section including a connecting portion with sides defining a compact cross section connectable with said member and merging into a tapered portion with increasingly wider and narrower sides defining increasingly oblong cross sections of smoothly increasing area away from the connecting portion, a curved elbow section extending from the tapered portion with increasingly extended wider sides defining increasingly oblong cross sections of nondecreasing area away from the connecting section, said elbow section being smoothly curved about an axis generally parallel with the wider sides, and a core attaching section extending away from the elbow section and having oblong cross sections with areas smoothly increasing toward a far end, said core attaching section being defined by wide sides and increasingly extended narrower sides toward the far end, said core attaching section being connectable at its far end with a charge cooler.

2. A curved angle duct for connection between a member having a compact cross section with essentially equal sides and a charge cooler connection having much larger area and an oblong cross section with wider and narrower sides, said duct comprising an entry section including an initial portion with essentially equal sides and a compact cross section connectable with said member and merging into a diffusing portion with increasingly wider and narrower sides defining increasingly oblong cross sections of smoothly increasing area away from the initial portion, a curved elbow section extending from the diffusing portion with increasingly extended wider sides defining increasingly oblong cross sections of nondecreasing area away from the entry section, said elbow section being smoothly curved about an axis generally parallel with the wider sides, and an exit section extending away from the elbow section and having oblong cross sections with areas smoothly increasing toward a far end, said exit section being defined by wide sides and increasingly extended narrower sides to provide further diffusion of fluid flowing therethrough, said exit section being connectable at its far end with a charge cooler.

3. An inlet duct as in claim 2 wherein the elbow section has an essentially constant cross-sectional area over a major portion of its length.

4. An inlet duct as in claim 2 wherein the elbow section has a smoothly increasing cross-sectional area in the direction of fluid flow over a major portion of its length.

5. An inlet duct as in claim 2 wherein the initial portion of the entry section has a circular cross section and the cross section at the far end of the exit section is rectangular.

6. In combination with a combustion engine having a charge intake, an engine driven turbocharger having a compressor with a charge outlet of compact cross section, a charge cooler connected with the engine intake and having an inlet of oblong cross section with much greater area than that of the compressor outlet, and a curved inlet angle duct connected between the compressor outlet and the charge cooler inlet for conducting intake charges from the compressor through the charge cooler to the engine intake, said inlet duct comprising an entry section including an initial portion with essentially equal sides and a compact cross section connected with the compressor outlet and merging into a diffusing portion with increasingly wider and narrower sides defining increasingly oblong cross sections of smoothly increasing area in the direction of flow away from the initial portion, a curved elbow section extending from the diffusing portion with increasingly extended wider sides defining increasingly oblong cross sections of nondecreasing area in the direction of flow away from the entry section, said elbow section being smoothly curved about an axis generally parallel with its wider sides, and an exit section extending away from the elbow section and having oblong cross sections with areas smoothly increasing in the direction of flow toward an outlet end, said exit section being defined by wide sides and increasingly extended narrower sides to provide further diffusion of flow therethrough, said exit section being connected at its outlet end with the charge cooler.

7. A combination as in claim 6 wherein the flow direction at the entry section of the inlet duct is essentially normal to that at the outlet of the exit section.

8. In combination with a combustion engine having a charge intake of relatively compact cross section, a charge cooler connected with the engine intake and having an outlet of oblong cross section with much greater area than that of the charge intake, and a curved outlet angle duct connected between the charge intake and the charge cooler outlet for conducting intake charges from the charge cooler to the engine intake, said outlet duct comprising a compact section including a connecting portion with essentially equal sides and a compact cross section connected with the engine intake and merging into a tapered portion with increasingly wider and narrower sides defining increasingly oblong cross sections of smoothly increasing area opposite the direction of flow toward the connecting portion, a curved elbow section extending from the tapered portion with increasingly extended wider sides defining increasingly oblong cross sections of nondecreasing area opposite the direction of flow toward the compact section, said elbow section being smoothly curved about an axis generally parallel with its wider sides, and a core attaching section extending away from the elbow section and having oblong cross sections with areas smoothly increasing opposite the direction of flow away from a far end, said core attaching section being defined by wide sides and increasingly extended narrower sides to provide initial acceleration of flow therethrough, said core attaching section being connected at its far end with the charge cooler.

* * * * *